Feb. 28, 1939. E. C. GODFREY 2,149,016
RACK
Filed April 14, 1938
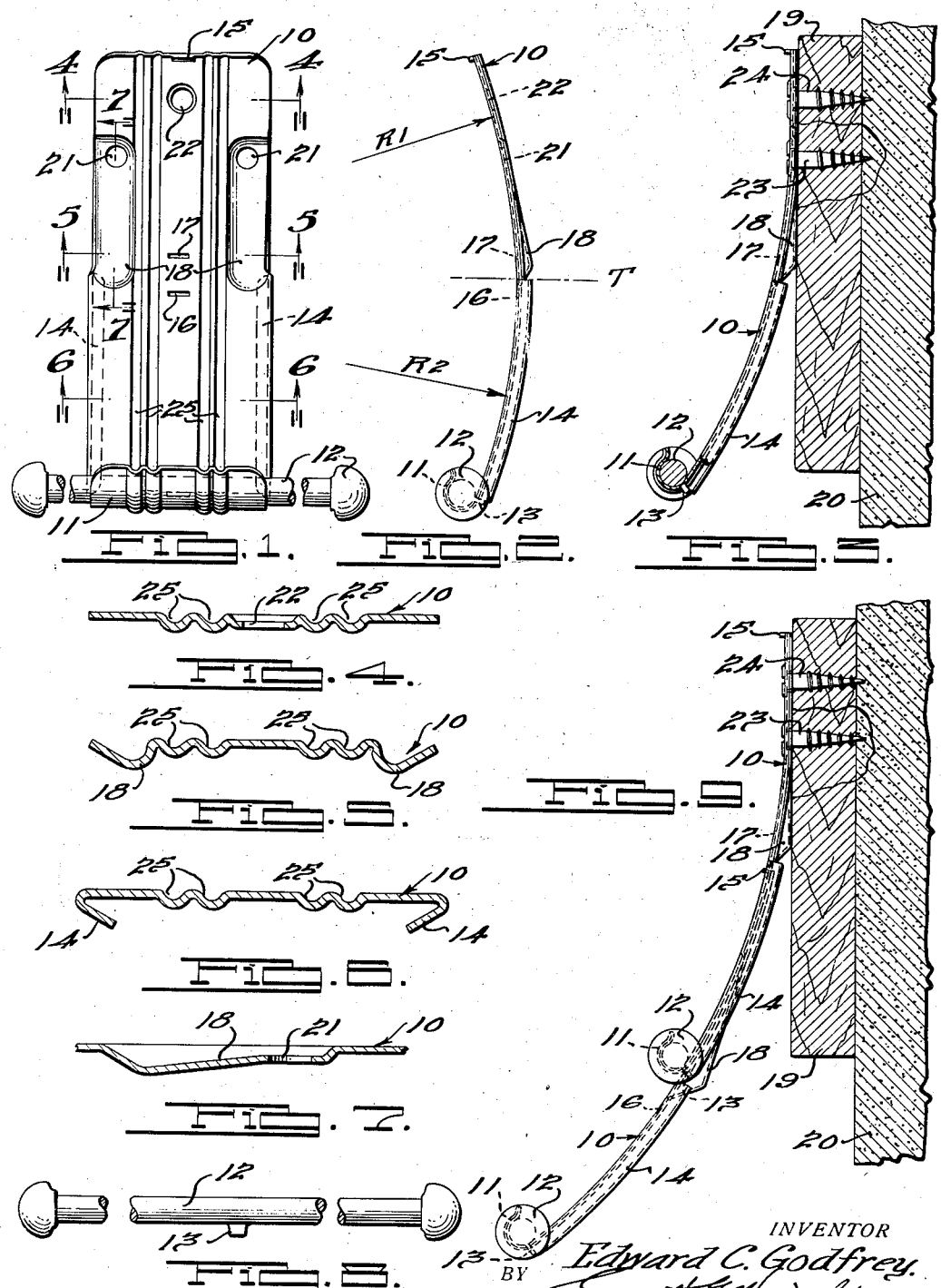
INVENTOR
Edward C. Godfrey.
BY Everett H. Wright
ATTORNEY Patented Feb. 28, 1939

2,149,016

UNITED STATES PATENT OFFICE 2,149,016

RACK

Edward C. Godfrey, Detroit, Mich.

Application April 14, 1938, Serial No. 201,908

8 Claims. (Cl. 211—123)

This invention relates to racks particularly adapted for use as towel racks and as general utility racks upon which clothing, linen and the like may be hung for storage or drying.

The primary object of this invention is to provide a sectional rack composed of one or more identical supporting members and one or more rack bars which may be easily and readily assembled into a single or multi-bar rack.

Another object of the invention is to provide a rack composed of a single supporting member and a rack bar supported thereby adapted to be extended into a multi-bar rack by telescoping like supporting members having like rack bars supported thereby in interlocked relationship with respect to the supporting member and rack bar next thereabove.

Another object of the invention is to provide a sectional rack composed of one or more identical supporting members each adapted to support a rack bar in downwardly and outwardly spaced relationship to the object to which one of the said supporting members may be secured or to the next above supporting member and rack bar supported thereby.

Another object of the invention is to provide a sectional rack composed of a supporting member and a rack bar adapted to be engaged and supported by the said supporting member in slidably and rotatably fixed relationship thereto, the said supporting member being adapted to hold the said rack bar in an outwardly and downwardly spaced relationship with respect to the object to which the said upper supporting member may be secured, the said supporting member being also adapted to telescopingly receive in interlocked relationship a like supporting member which supports and holds a like rack bar in slidably and rotatably fixed relationship therein and in outwardly and downwardly spaced relationship with respect to the next above rack bar.

Other objects of the invention will become apparent by reference to the following detailed description taken in connection with the accompanying drawing, in which:

Fig. 1 is a front elevational view of a towel rack embodying the invention.

Fig. 2 is a side elevational view of the towel rack disclosed in Fig. 1.

Fig. 3 is a view part in section and part in elevation showing the towel rack disclosed in Figs. 1 and 2 secured to a chair rail, dado moulding or the like.

Fig. 4 is an enlarged detailed cross sectional view taken on the line 4—4 of Fig. 1.

Fig. 5 is an enlarged detailed cross sectional view taken on the line 5—5 of Fig. 1.

Fig. 6 is an enlarged detailed cross sectional view taken on the line 6—6 of Fig. 1.

Fig. 7 is an enlarged detailed vertical sectional view taken on the line 7—7 of Fig. 1.

Fig. 8 is an elevational view showing the tabbed rack bar preferably used in the embodiment of the invention disclosed.

Fig. 9 is a view part in section and part in elevation showing how two identical supporting members and two rack bars are telescoped and interlocked to provide a multi-bar towel rack.

Referring now to the drawing wherein like numerals refer to like and corresponding parts throughout the several views, the embodiment of the invention disclosed therein comprises, in general, a supporting member 10 having a rolled lower end 11 which supports and frictionally grips a rack bar 12 as best indicated in Figs. 1 to 3 inclusive, the said rack bar 12 being preferably provided with a centrally disposed tab 13 which projects in a suitably slotted aperture formed in the support 10 at the rear of the said rolled lower end 11 thereof whereby to fix the said rack bar 12 against turning or sliding with respect to the said support 10.

The said support 10 is preferably formed arcuately concaved toward the front thereof at two radii, R1 and R2, the dot and dash line T in Fig. 2 indicating the approximate point of tangency of the two radii. R1 is preferably slightly greater or less than R2 so that when the upper half of one support 10 is telescoped between guides 14 formed at the rear of the sides of the lower half of another and like support 10 as indicated in Fig. 9, the two supports 10 will become firmly interlocked. To prevent any lower support 10 from becoming disengaged from the support 10 next above after having been telescoped between the guides 14 thereof, a forwardly disposed tab 15 is formed at the top of each supporting member 10 so positioned as to project in a slot 16 in the said support member 10 thereabove. Another slot 17 is provided in the said support 10 to receive the lower end of the centrally disposed tab 13 of the rack bar 12 fixed in the lower rolled end 11 of the next above support member.

The said support 10 is suitably formed to provide a pair of laterally spaced vertically disposed beveled heels 18 substantially as indicated in Figs. 1, 2 and 7 which hold the lower end of the support 10 outwardly spaced from the object to which it is secured. The outer sides of the said heels 18 are formed on an angle complementary with respect to the angle at which the guides 14 are formed, see Figs. 5 and 6, to admit of slidable engagement therewith when the upper end of one support 10 is telescoped between the guides 14 of another support 10.

Figs. 3 and 9 show respectively a typical installation of a single and a double bar rack embodying the invention secured to a chair rail, dado moulding or like wood trim 19 of the plaster wall 20. The support 10 is preferably provided with a pair of laterally spaced apertures 21 disposed near the upper end of the heel 18 and a single centrally disposed aperture 22 located near the top of the said support 10. The two wood screws 23 disposed through the said laterally spaced apertures 21 secure the said support 10 against the chair rail or the like 19 with the beveled heels 18 of the said support 10 positioned against the said chair rail or the like 19. The single wood screw 24 disposed through the upper centrally disposed aperture 22 pulls the upper curved portion of the support 10 above the top of the heels 18 thereof flat against the chair rail or the like 19 until the uppermost quarter of the said support 10 is substantially tangent with respect to the bottom of the said heels 18 and parallel to the surface of the chair rail or the like 19 to which the support 10 is secured, all as best shown in Figs. 3 and 9.

Fig. 9 shows a second support 10 fixed in telescoped and interlocked relationship with a like support 10 secured to a chair rail or the like 19 in the manner hereinbefore described. It will be noted that the tab 15 at the top of the lower support 10 and the tab 13 of the rack bar 12 carried by the upper support 10 engage the upper support 10 and the lower support 10 respectively at the slots 16 and 17 therein respectively. The supports 10 must be flexed lightly to temporarily straighten out the curvature of the upper half of one support with respect to the curvature of the lower half of the other support during the assembly thereof into a multi-bar rack, which straightening out is automatically accomplished when telescoping the upper half of one support 10 between the guides 14 formed at the rear of the lower half of another support 10. Once two supports 10 are completely assembled with respect to each other, a comparatively sharp manual flexing of one support 10 with respect to the other support 10 after the removal of the rack bars 12 therefrom is necessary to disengage the tab 15 of one support 10 from engagement in the slot 16 in the other support 10 to admit of telescopic disassembly.

Each support 10 is preferably ornamented by such means as forming a plurality of vertically disposed flutes 25 therein as best indicated in Figs. 1, 4, 5 and 6.

Although only a single and a double rack assembly has been shown and described, any desired reasonable number of identical rack supports and rack bars may be assembled and telescoped in interlocked relationship as hereinbefore described, it requiring only one type of supporting member and only one type of rack bar to provide multi-bar racks having two, three, four or more rack bars.

Although but one embodiment of this invention has been disclosed and described herein, it will be understood that various changes including the size, shape, arrangement and details of the various parts thereof may be made without departing from the spirit of the invention, and it is not intended to limit the scope of the invention other than by the terms of the appended claims.

I claim:

1. A rack of the class described comprising, in combination, an arcuate support of resilient material, means formed at the rear of the said support for positioning the lower portion thereof arcuately forward of the object to which the said support is secured when the upper portion of the said support is flattened against the said object by the means employed to secure the said support to the said object, a rack bar, the lower end of the said support being formed to frictionally engage and support the said rack bar, and a tab on said rack bar adapted to engage the said support at a suitable aperture formed therein whereby to prevent the said rack bar from sliding and turning with respect to the said support.

2. A rack of the class described comprising, in combination, an arcuate support of resilient material, means for securing the upper portion of the support to an object, a rack bar, the lower end of the said support being formed to frictionally engage and support the said rack bar, and a tab on said rack bar adapted to engage the said support at a suitable aperture formed therein whereby to prevent the said rack bar from sliding and turning with respect to the said support.

3. A rack of the class described comprising, in combination, an arcuate support of resilient material, means for securing the upper portion of the support to an object, a rack bar, the lower end of the said support being formed to frictionally engage and support the said rack bar, a tab on said rack bar adapted to engage the said support at a suitable aperture formed therein whereby to prevent the said rack bar from sliding and turning with respect to the said support, and a pair of guides formed along the sides of the lower portion of the said support adapted to receive in telescopic engagement the upper portion of a like arcuate support carrying a like rack bar whereby to support the said second rack bar in downwardly and outwardly spaced relationship from the first rack bar.

4. A rack of the class described comprising, in combination, an arcuate support of resilient material, means formed at the rear of the said support for positioning the lower portion thereof arcuately forward of the object to which the said support is secured when the upper portion of the said support is flattened against the said object by the means employed to secure the said support to the said object, a rack bar, the lower end of the said support being formed to frictionally engage and support the said rack bar, a tab on said rack bar adapted to engage the said support at a suitable aperture formed therein whereby to prevent the said rack bar from sliding and turning with respect to the said support, and a pair of guides formed along the sides of the lower portion of the said support adapted to receive in telescopic engagement the upper portion of a like arcuate support carrying a like rack bar whereby to support the said second rack bar in downwardly and outwardly spaced relationship from the first rack bar.

5. A rack of the class described comprising, in combination, an arcuate support of resilient material, means for securing the upper portion of the support to an object, a rack bar, the lower end of said support being formed to frictionally engage and support the said rack bar, a tab on said rack bar adapted to engage the said support at a suitable aperture formed therein whereby to prevent the said rack bar from sliding and turning with respect to the said support, a pair of guides formed along the sides of the lower half of the said support adapted to receive in telescopic engagement the upper portion of a like arcuate support carrying a like rack bar whereby to support the said second rack bar in downwardly and outwardly spaced relationship from the first rack bar, and means for maintaining the said supports in telescopic engagement with respect to each other.

6. A rack of the class described comprising, in combination, an arcuate support of resilient material, means formed at the rear of the said support for positioning the lower portion thereof arcuately forward of the object to which the said support is secured when the upper portion of the said support is flattened against the said object by the means employed to secure the said support to the said object, a rack bar, the lower end of the said support being formed to frictionally engage and support the said rack bar, a tab on said rack bar adapted to engage the said support at a suitable aperture formed therein whereby to prevent the said rack bar from sliding and turning with respect to the said support, a pair of guides formed along the sides of the lower half of the said support adapted to receive in telescopic engagement the upper portion of a like arcuate support carrying a like rack bar whereby to support the said second rack bar in downwardly and outwardly spaced relationship from the first rack bar, and means for maintaining the said supports in telescopic engagement with respect to each other.

7. A rack of the class described comprising, in combination, an arcuate support of resilient material having its upper half formed at a slightly different radius than the radius of its lower half, means for securing the upper portion of the support to an object, a rack bar, the lower end of the said support being formed to frictionally engage and support the said rack bar, a tab on said rack bar adapted to engage the said support at a suitable aperture formed therein whereby to prevent the said rack bar from sliding and turning with respect to the said support, a pair of guides formed along the sides of the lower half of the said support adapted to receive in telescopic engagement the upper portion of a like arcuate support carrying a like rack bar whereby to support the said second rack bar in downwardly and outwardly spaced relationship from the first rack bar, and means for maintaining the said supports in telescopic engagement with respect to each other.

8. A rack of the class described comprising, in combination, an arcuate support of resilient material having its upper half formed at a slightly different radius than the radius of its lower half, means formed at the rear of the said support for positioning the lower portion thereof arcuately forward of the object to which the said support is secured when the upper portion of the said support is flattened against the said object by the means employed to secure the said support to the said object, a rack bar, the lower end of the said support being formed to frictionally engage and support the said rack bar, a tab on said rack bar adapted to engage the said support at a suitable aperture formed therein whereby to prevent the said rack bar from sliding and turning with respect to the said support, a pair of guides formed along the sides of the lower half of the said support adapted to receive in telescopic engagement the upper portion of a like arcuate support carrying a like rack bar whereby to support the said second rack bar in downwardly and outwardly spaced relationship from the first rack bar, and means for maintaining the said supports in telescopic engagement with respect to each other.

EDWARD C. GODFREY.